United States Patent

Gheorghiu et al.

[11] Patent Number: 6,027,684
[45] Date of Patent: Feb. 22, 2000

[54] METHOD FOR FIRING CERAMIC HONEYCOMB BODIES

[75] Inventors: Tudor C. Gheorghiu, Painted Post, N.Y.; Andreas Schmidt, Kaiserslautern, Germany

[73] Assignee: Corning Incorporated, Corning, N.Y.

[21] Appl. No.: 09/157,916

[22] Filed: Sep. 22, 1998

Related U.S. Application Data

[60] Provisional application No. 60/061,262, Oct. 3, 1997.

[51] Int. Cl.$^7$ .................................................. C04B 35/195
[52] U.S. Cl. ......................... 264/631; 264/656; 264/657; 264/669; 264/670
[58] Field of Search .................................. 264/631, 669, 264/670, 674, 656, 657

[56] References Cited

U.S. PATENT DOCUMENTS

| | | |
|---|---|---|
| 3,755,204 | 8/1973 | Sergeys . |
| 3,985,846 | 10/1976 | Lundsager et al. . |
| 4,051,231 | 9/1977 | Bond et al. . |
| 4,404,166 | 9/1983 | Wiech, Jr. . |
| 4,474,731 | 10/1984 | Brownlow et al. . |
| 4,795,598 | 1/1989 | Billiet . |
| 4,927,577 | 5/1990 | Ohtaka et al. . |
| 5,078,929 | 1/1992 | Matsumae et al. ..................... 264/344 |
| 5,183,609 | 2/1993 | Miyahara . |
| 5,248,255 | 9/1993 | Morioka et al. . |
| 5,258,150 | 11/1993 | Merkel et al. . |
| 5,262,102 | 11/1993 | Wada . |
| 5,409,870 | 4/1995 | Locker ..................................... 264/631 |
| 5,419,857 | 5/1995 | Van den Sype . |

OTHER PUBLICATIONS

"Retrofitting Tunnel Kilns", The American Ceramic Society Bulletin, vol. 76,. No 2, Feb. 1997, pp. 48–52.
"Pulse/Proportional Jet Firing at Work", Ceramic Industry.
"Jet Firing with Pulse/Proportional Control", American Ceramic Society Bulletin, vol. 73, No. 3, Mar. 1994, pp. 93–96.

Primary Examiner—James Derrington
Attorney, Agent, or Firm—Timothy M. Schaeberle

[57] ABSTRACT

A method of fabricating a cordierite ceramic honeycomb structural body which includes the following steps: formulating a batch of raw materials comprising a mixture of kaolin clay, talc, alumina and other cordierite-forming materials, each included in the batch in an effective amount such that the batch is capable of yielding a fired honeycomb body whose predominant crystal phase is cordierite; intimately blending the raw materials with an effective amount of vehicle and forming aids to impart plastic formability and green strength to the raw materials and to form a plastic mixture; forming the raw materials into a green honeycomb structural body by extrusion and thereafter drying and firing the green honeycomb structural body. The firing of the green honeycomb structural body is accomplished through a four-phase heating process as follows (1) heating the green body to a first temperature ranging between about 750–850° C.; (2) heating to a second temperature ranging between about 1250 to 1350° C.; and finally, (3) to a third temperature of at least 1390° C., and (4) maintaining a temperature of at least 1390 but less than 1420° C., for a period of about 12 to 20 hours. In one embodiment, an oxidizing firing atmosphere, comprising no greater than about 6% $O_2$, is maintained at firing temperatures above the first temperature. Alternatively, a reducing as opposed to an oxidizing, firing atmosphere, comprising no greater than about 3% CO, is maintained at firing temperatures above the first temperature.

19 Claims, 2 Drawing Sheets

METHOD FOR FIRING CERAMIC HONEYCOMB BODIES

This application claims the benefit of U.S. Provisional Application No. 60/061,262, filed Oct. 3, 1997, entitled "Method for Firing Ceramic Honeycomb Bodies", by Tudor C. Gheorghiu and Andreas Schmidt.

1. Field of the Invention

The present invention relates to a method of fabricating cordierite ceramic honeycomb structural bodies. In particular, the invention relates to method of fabrication utilizing firing processes involving atmosphere control resulting in cordierite ceramic honeycomb structural bodies exhibiting improved thermal expansion and strength properties.

2. Background of the Invention

Structures, commonly shaped as a honeycomb, made from cordierite, a crystalline magnesium aluminum silicate material ($2MgO \cdot 2Al_2O_3 \cdot 5SiO_2$) are known to exhibit a low coefficient of thermal expansion over a rather wide temperature range. Major proportions of this phase in a ceramic body therefore impart excellent thermal shock resistance to the body.

By virtue of this excellent thermal shock resistance and refractoriness, extruded monolithic ceramic honeycomb structures comprising cordierite or substituted cordierite as the principal crystalline phase, have found widespread use as catalyst supports and filters in the treatment of combustion exhaust gases produced by internal combustion engines. Other useful products made from such material can be employed as filters for fluids such diesel particulate filters and ultrafiltration devices, or as substrates for woodstove combustors or DeNOX catalytic converters for power plants. U.S. Pat. Nos. 3,885,977 (Frost et al.), 4,001,028 (Frost et al.), 5,114,644 (Beall et al) and 5,258,150 (Merkel et al.) describe the manufacture of such bodies from extrudable batch mixtures of clay, talc, and alumina, these components reacting to form cordierite as the extruded body upon firing of the formed body.

While cordierite products such as described in these patent have exhibited adequate strength and thermal shock resistance for many applications, certain applications, such as the use in motor vehicles involve repeated and extensive physical and thermal shocks. Thus careful packaging is required to minimize the incidence of product breakage. For these applications, particularly, improvements in strength and/or thermal shock resistance would be beneficial.

Accordingly, it is a principal objective of the present invention to provide a method for fabrication of cordierite ceramic honeycomb structural bodies involving controlled atmosphere firing resulting in cordierite ceramic honeycomb structural bodies exhibiting increased strength and thermal shock resistance.

Other objectives of the invention will become apparent from the following description thereof.

SUMMARY OF THE INVENTION

The present invention provides a method for fabricating a cordierite ceramic honeycomb structural body exhibiting improved strength and thermal shock resistance. An additional benefit of this controlled atmosphere firing is a reduced shrinkage upon firing.

The present invention is directed at a method of fabricating a cordierite ceramic honeycomb structural body which includes the following steps: formulating a batch of raw materials comprising a mixture of kaolin clay, talc, alumina and other cordierite-forming materials, each included in the batch in an effective amount such that the batch is capable of yielding a fired honeycomb body whose predominant crystal phase is cordierite; intimately blending the raw materials with an effective amount of vehicle and forming aids to impart plastic formability and green strength to the raw materials and to form a plastic mixture; forming the raw materials into a green honeycomb structural body by extrusion and thereafter drying and firing the green honeycomb structural body. The firing of the green honeycomb structural body is accomplished through a four-phase heating process as follows (1) heating the green body to a first temperature ranging between about 750–850° C.; (2) heating to a second temperature ranging between about 1250 to 1350° C.; and finally, (3) to a third temperature of at least 1390° C., and (4) maintaining a temperature of at least 1390 but less than 1420° C., for a period of about 12 to 20 hours. In one embodiment, an oxidizing firing atmosphere, comprising no greater than about 6% $O_2$, is maintained at firing temperatures above the first temperature. Cordierite ceramic honeycomb structural bodies having improved strength are obtained with this controlled oxidizing firing procedure.

In another embodiment the firing of the green honeycomb structural body is accomplished under the same controlled four phase firing schedule, however a reducing as opposed to an oxidizing, firing atmosphere, comprising about no greater than about 3% CO, is maintained at firing temperatures above the first temperature. Cordierite ceramic honeycomb structural bodies having improved thermal shock resistance, strength and firing shrinkage are obtained with this controlled reducing firing procedure.

BRIEF DESCRIPTION OF THE FIGURES

For a better understanding of the invention, reference is made to the following attached drawings, wherein.

DETAILED DESCRIPTION OF THE INVENTION

Figure 2:
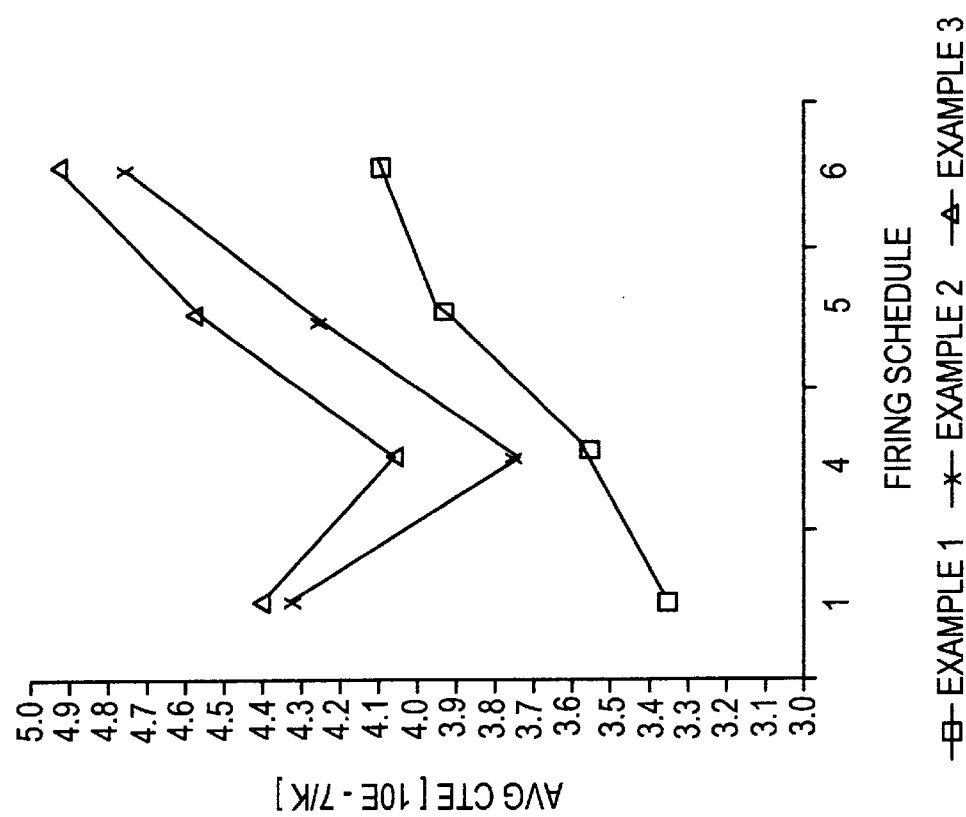
FIG. 2 is a graph illustrating a comparison of the coefficient of thermal expansion (CTE) for three separately extruded cordierite containing honeycomb bodies having comparable compositions fired utilizing four different firing atmospheres.

Raw materials for ceramic batches useful in the production of cordierite ceramic honeycomb structural bodies, fabricated in accordance with the invention, may be selected from any suitable source. High-purity clay, talc, silica, alumina, aluminum hydroxides and magnesia (MgO)-yielding raw materials are conventionally used for such ceramics and are satisfactory here. However, as is well known, the thermal expansion and refractoriness of cordierite products are adversely affected by the presence of impurities such as calcia (CaO) and the alkalis such as soda and potash. Thus where optimum refractoriness and thermal shock resistance are required in the product, batch raw materials substantially free of Ca, Na and K will be utilized.

The preferred batch materials in commercial use for the production of very low expansion extruded cordierite ceramic bodies are clay, talc, and alumina, with the clays typically constituting kaolinitic clays of a platey rather than stacked habit. Platey kaolins can be produced by the pre-processing of stacked kaolinite clays, or the raw material batch including the clay can be processed in a way which breaks down the crystal stacks into platelets.

The forming of the dry batch into a preform or green body suitable for conversion to cordierite by firing can be accomplished by any one of a number of known techniques. Depending on the porosity desired in the cordierite product the batch may be mixed with suitable binders and simply pressed into the shape of a preform, or it may be formed by a hot pressing method.

For the commercial manufacture of flat or thin-walled cordierite ceramic products such as ceramic honeycombs, the preferred forming technique is extrusion. A batch mixture suitable for extrusion can be prepared from the dry batch by mixing the batch with a suitable liquid vehicle. The vehicle may comprise water and extrusion aids necessary to give the batch plastic formability and sufficient green strength after forming to resist breakage prior to firing. Alternatively, extrusion aids may be mixed with the ceramic batch materials.

The extrusion aids will normally comprise both binders and plasticizers; methyl cellulose and alkali stearates are examples of some of the extrusion aids which have been and may be used. Batches of this type, which generally contain 25–35% water, are sufficiently plastic so that they can readily be formed by extrusion into preforms comprising very thin wall dimensions, i.e. less than 1 mm. The plasticized batches can also be formed conveniently by rolling or pressing, the rolled or pressed components then being either used directly or assembled into more complex shapes prior to firing. The firing procedure used to convert the plasticized batch or ceramic green body into a cordierite-containing ceramic product critically affects the properties of the resulting ceramic. Conventional firing processes utilized currently comprise firing the green body to temperatures in the range of 1340–1450° C. while maintaining an oxidizing firing atmosphere typically containing upwards of 6% $O_2$. Although this conventional firing process has produced acceptable cordierite-containing ceramic product, it has been discovered that various properties, including strength and thermal shock resistance can be modified and improved through various modified firing procedures.

In accordance with the method of the present invention, a cordierite honeycomb structural body is obtained through use of a four phase firing process wherein the green ceramic honeycomb structural body is first fired to a temperature at which burnout of any organics present in the body and removal of adsorbed water can be completed. This first firing phase typically requires heating to a first temperature ranging between about 750–850° C. Following this initial firing phase, the second firing phase involves further heating the green honeycomb structural body, in an oxidizing atmosphere comprising no greater than about 6% $O_2$, to a second temperature ranging between about 1250 to 1350° C. The third heating phase involves heating the green honeycomb structural body, again maintaining an oxidizing atmosphere comprising no greater than about 6% $O_2$ to a third temperature of at least 1390° C. but less than 1420° C. Lastly the fourth firing phases involves maintaining the structural honeycomb at or above the 1390° C. temperature for a period sufficient to obtain complete crystallization of the ceramic body; about 12 to 20 hours is typically sufficient. During the temperature soak-fourth firing phase, an oxidizing atmosphere comprising no greater than about 6% $O_2$, is again maintained. Utilizing this low oxygen, controlled firing procedure, cordierite ceramic honeycomb structural bodies are obtained exhibiting improved strength when compared to cordierite ceramics fired using standard firing procedures.

In a preferred embodiment of the above four phase-firing procedure, the following temperature ranges are utilized: (1) a first temperature range of between about 790 to 810° C., with approximately 800° C. being the most preferred temperature; (2) a second temperature range of between about 1275 to 1285° C., with approximately 1280° C. being the most preferred temperature; (3) a third temperature range of between about 1400 to 1405° C., with 1430° C. being the most preferred.

The preferred firing rates for the above four phase-firing procedure are as follows: (1) a firing rate of between about 40–100° C. is preferred during the firing from the first to the second temperature range; and, (2) a firing rate of between about 10–50° C. is preferred during the firing from the second to the third temperature range.

The preferred atmosphere for the above four phase-firing procedure comprises maintaining the following oxidizing atmosphere: (1) about 5% $O_2$ during the entire period of firing from the first temperature to the second temperature; (2) about 1% $O_2$ during the entire period of firing from the second temperature to the third temperature; and, (3) about 2% $O_2$ during entire temperature soak period.

One variation of the above four phase firing cycle involves maintaining a reducing atmosphere comprising 2% CO, during the entire temperature soak fourth firing phase. Ceramic cordierite honeycomb structural bodies obtained using this controlled firing procedure generally exhibit improved thermal shock resistance and comparable strength versus those bodies obtained using standard firing procedures.

In another embodiment the firing of the green honeycomb structural body comprises the same initial first firing phase. Following this initial firing the next three firing phases of the controlled firing schedule comprise the same temperature schedule, however a reducing as opposed to an oxidizing, firing atmosphere, comprising no greater than about 3% CO, is maintained. Utilizing this low reducing, controlled firing procedure, cordierite ceramic honeycomb structural bodies are obtained exhibiting improved thermal shock resistance, strength and firing shrinkage when compared to cordierite ceramics fired using standard firing procedures.

The invention may be further understood by reference to the following detailed Examples, which are intended to be merely illustrative of the presently preferred method for carrying out the invention.

EXAMPLES

Three ceramic batches suitable for the production of a cordierite-containing ceramics of the following compositions, in parts by weights, were prepared:

TABLE I

| RAW MATERIAL | EXAMPLE 1 | EXAMPLE 2 | EXAMPLE 3 |
|---|---|---|---|
| Georgia Kaolin Hydrite MP clay | 12.5% | 12.5% | 12.5% |
| Georgia Kaolin Glomax LL clay | 21% | 21% | 21% |
| Barretts Minerals 96-76 talc | 35% | 35% | 35% |
| Alcoa HVAFG alumina | 14% | — | — |
| Alcan C701RGE alumina | — | 14% | 14% |
| Uninun Imsil siliciumdioxyde | 2.5% | 2.5% | 2.5% |
| Recycled green material | 12% | 12% | 12% |
| Methyl cellulose plasticizer/binder | 2.5% | 2.5% | 2.5% |
| Alkali stearate extrusion aid | 0.5% | 0.5% | 0.5% |

Each of the three batches were thoroughly blended to form a homogeneous batch.

An extrusion batch for each of the three Examples was separately prepared from the dried batch material by adding water to the dry batch in a "LÖDIGE" plow-shearing mixer (Stamford, Conn.). Water was added to a level of about 31% of total batch weight, and mixing was continued for about 3 minutes to achieve batch uniformity. The three mixed batches were separately extruded at about 2800 psi to form honeycomb substrates having a 4.0–5.66" diameter, a 3.8–6.0" length and having 400 cells/sq.in.

The green ceramic honeycomb substrates thus provided were next dried and fired to convert them to cordierite ceramics according to each of the six firing atmosphere schedules listed in Table II and Table III below. All the ceramic substrates were fired using the same time/temperature schedule but different firing atmosphere according to Table II and Table III; each honeycomb substrate being converted from a green honeycomb ceramic to a cordierite-containing ceramic honeycomb body.

Referring specifically to Table II, the firing schedules reported therein are categorized as follows: (1) Firing Schedule No. 1 is representative of a firing schedule comprising a standard firing atmosphere; (2) Firing Schedule No. 2 is representative of a firing schedule utilizing a high $O_2$ firing atmosphere; (3) Firing Schedule No. 3 is representative of one embodiment of the inventive firing schedule utilizing a low $O_2$ firing atmosphere; and, (4) Firing Schedule Nos. 4–6 are representative embodiments of firing schedules utilizing the inventive reducing firing atmosphere.

TABLE II

| FIRING SCHEDULE NO. | TEMPERATURE RANGE (° C.) | FIRING ATMOSPHERE |
|---|---|---|
| 1 | 800–1160 | 6% $O_2$ |
|   | 1160–1280 | 6% $O_2$ |
|   | 1280–1403 | 6% $O_2$ |
|   | soak at 1403 | 4% $O_2$ |
| 2 | 800–1160 | 9% $O_2$ |
|   | 1160–1280 | 9% $O_2$ |
|   | 1280–1403 | 7% $O_2$ |
|   | soak at 1403 | 7% $O_2$ |
| 3 | 800–1160 | 5% $O_2$ |
|   | 1160–1280 | 5% $O_2$ |
|   | 1280–1403 | 1% $O_2$ |
|   | soak at 1403 | 2% $O_2$ |
| 4 | 800–1160 | 6% $O_2$ |
|   | 1160–1280 | 6% $O_2$ |
|   | 1280–1403 | 6% $O_2$ |
|   | soak at 1403 | 2% CO |
| 5 | 800–1160 | 2% CO |
|   | 1160–1280 | 1% $O_2$ |
|   | 1280–1403 | 2% CO |
|   | soak at 1403 | 2% CO |
| 6 | 800–1160 | 2% CO |
|   | 1160–1280 | 2% CO |
|   | 1280–1403 | 2% CO |
|   | soak at 1403 | 2% CO |

TABLE III

| Heating Rate (° C./hour) | Temperature Range (° C.) |
|---|---|
| 55 | Room temperature–600 |
| 86 | 600–700 |
| 100 | 700–900 |
| 93 | 900–1040 |
| 40 | 1040–1160 |
| 72 | 1160–1280 |
| 40 | 1280–1320 |
| 35 | 1320–1390 |
| 7 | 1390–1397 |
| 6 | 1397–1403 |

The resulting fired cordierite-ceramic honeycomb bodies, three extrusion runs of comparable compositions and utilizing 6 different firing atmospheres, were evaluated for physical properties. Table IV below reports the results of an evaluation of each of these separately extruded and variously fired honeycomb bodies. Included in Table IV for each formed ceramic body is an average modulus of rupture strength (MOR), in kPa. Also reported for various formed ceramic bodies is an average coefficient of thermal expansion value (CTE), in $10^{-7}$/°C. as determined by measurement over the range 25–800° C. composition and the average size shrinkage, in %, i.e., the difference between green honeycomb body and fired honeycomb body dimensions divided by the green honeycomb body dimension.

TABLE IV

| EXTRUSION/ EXAMPLE NO. | FIRING SCHEDULE | MOR (kPa) | CTE ($10^{-7}$/° C.) | SHRINKAGE (%) |
|---|---|---|---|---|
| 1 | 1 | 1000 | 3.35 | 2.65 |
|   | 2 | 960 | — | — |
|   | 3 | 1030 | — | — |
|   | 4 | 1025 | 3.55 | 2.65 |
|   | 5 | 1030 | 3.95 | 2.45 |
|   | 6 | 1080 | 4.10 | 2.35 |
| 2 | 1 | 935 | 4.35 | 1.95 |
|   | 2 | 910 | — | — |
|   | 3 | 955 | — | — |
|   | 4 | 925 | 3.75 | 1.95 |
|   | 5 | 970 | 4.25 | 1.75 |
|   | 6 | 985 | 4.75 | 1.70 |
| 3 | 1 | 1045 | 4.40 | 2.15 |
|   | 2 | 1040 | — | — |
|   | 3 | 1060 | — | — |
|   | 4 | 1015 | 4.05 | 2.15 |
|   | 5 | 1075 | 4.55 | 1.95 |
|   | 6 | 1130 | 4.95 | 1.90 |

Figure 1:
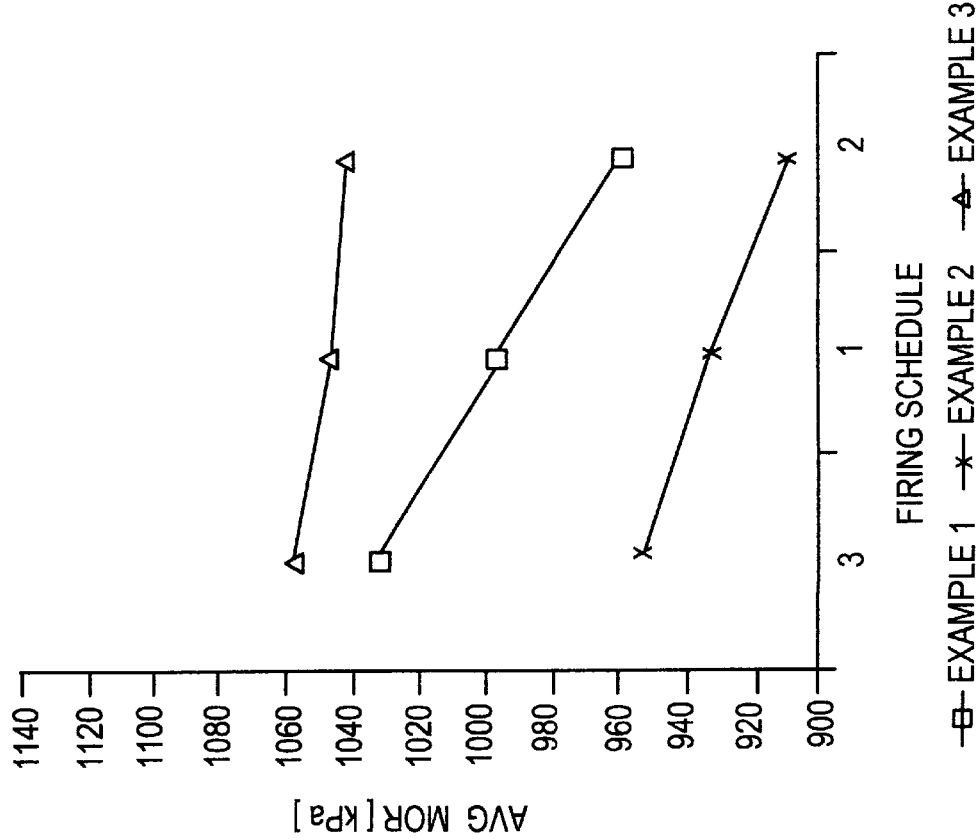
FIG. 1 is a graph illustrating a comparison of the modulus of rupture (MOR) curves for three separately extruded cordierite containing honeycomb bodies having comparable compositions fired utilizing three different firing atmospheres.
Figure 3:
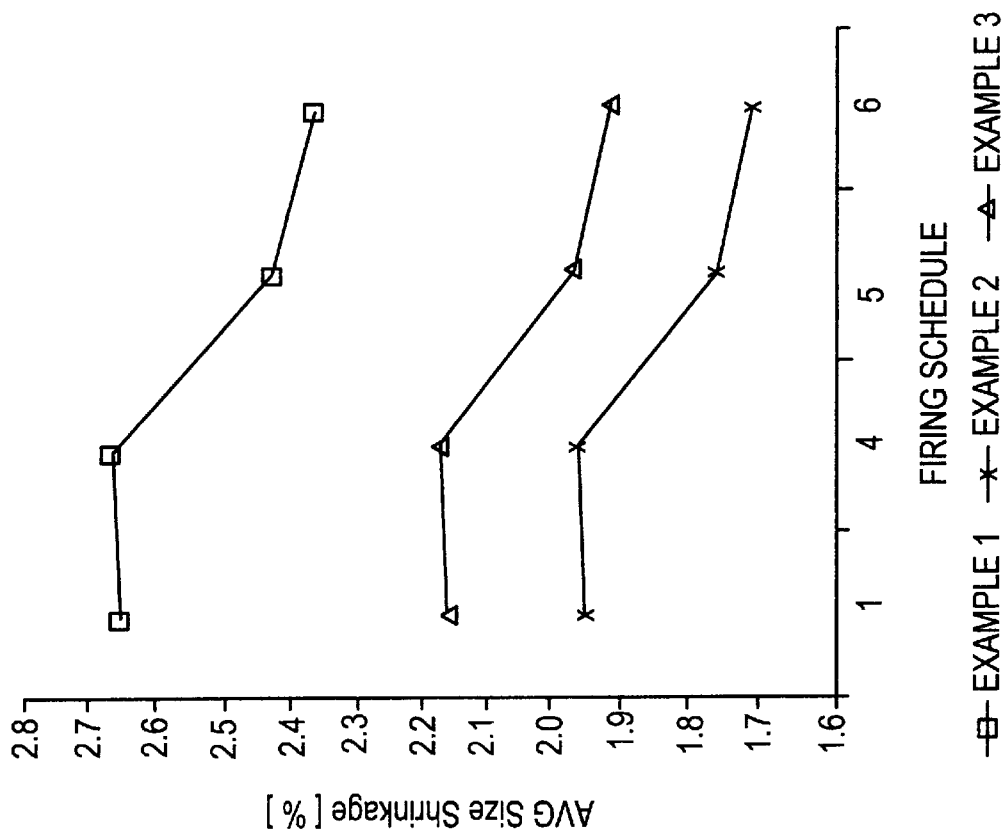
FIG. 3 is a graph illustrating a comparison of the coefficient of modulus of rupture (MOR) for three separately extruded cordierite containing honeycomb bodies having comparable compositions fired utilizing four different firing atmospheres.
Figure 4:
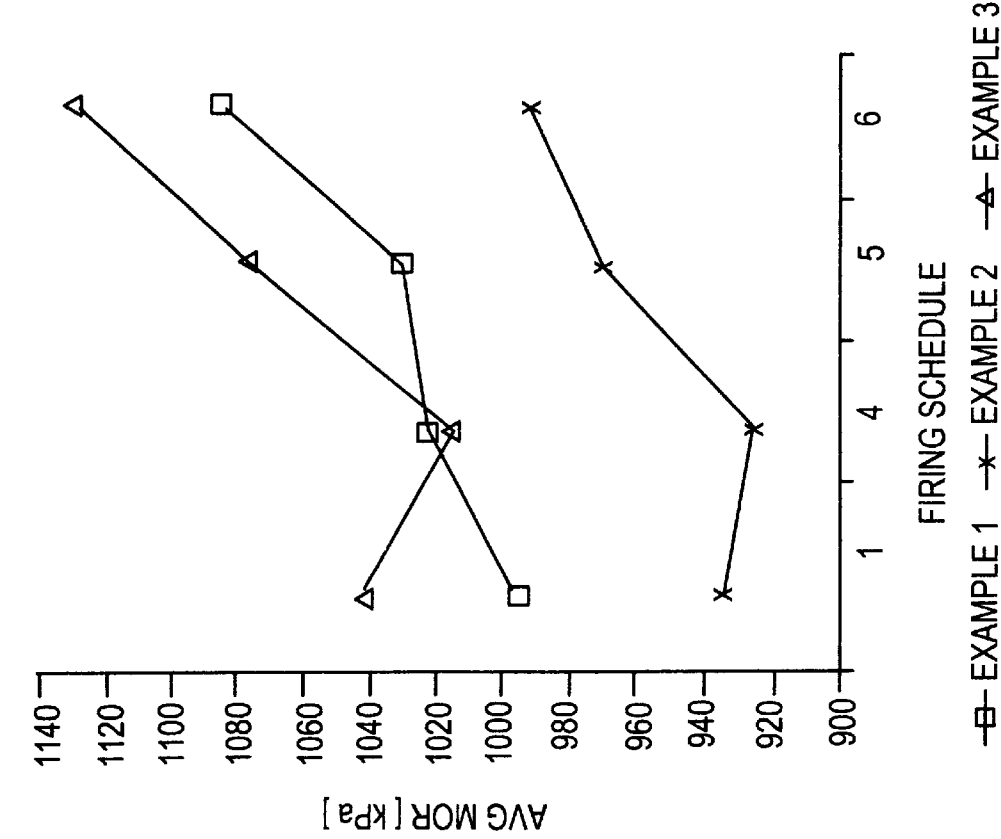
FIG. 4 is a graph illustrating a comparison of the thermal shrinkage for three separately extruded cordierite containing honeycomb bodies having comparable compositions fired utilizing four different firing atmospheres.

An examination of the foregoing data reveals the following. Firstly, the cordierite ceramic body fired under a low $O_2$ atmosphere conditions exhibited an increased MOR over that exhibited by the cordierite ceramic bodies fired under either standard or high $O_2$ atmosphere firing conditions. This result is more clearly illustrated in an examination of FIG. 1; i.e., all three compositions fired at firing schedule number 3 (low O2) exhibited a increased MOR when compared to the same composition fired at either firing schedule number 1 or 2. Secondly, the cordierite ceramic bodies fired under reducing conditions generally exhibited an increased CTE over that exhibited by the cordierite ceramic body fired under standard atmosphere firing conditions. This result is more clearly illustrated in an examination of FIG. 2, i.e., the compositions fired at firing schedule no. 6 (2% CO maintained throughout the firing) exhibited increased CTE when compared to the same compositions fired under the standard firing conditions of firing schedule number 1. Thirdly, the cordierite ceramic bodies fired under a reducing atmosphere conditions exhibited an increased MOR over that exhibited by the ceramic body fired under standard atmosphere firing conditions. This result is more clearly illustrated in an examination of FIG. 3; i.e., all three compositions fired at either the reducing conditions of firing schedule numbers 5 or 6 exhibited an increased MOR when compared to the same composition fired under the standard atmosphere conditions of firing schedule number 1. Lastly, the cordierite ceramic bodies fired under a reducing atmosphere conditions exhibited a lowered firing shrinkage over that exhibited by the ceramic body fired under standard atmosphere firing conditions. This result is more clearly illustrated in an examination of FIG. 4; i.e., all three compositions fired at either the reducing conditions of firing schedule numbers 5 or 6 exhibited a lowered percentage shrinkage when compared to the same composition fired under the standard atmosphere conditions of firing schedule number 1.

As is apparent from the aforementioned detailed description, changes in the atmosphere utilized in the firing processes of the instant invention affects the properties, specifically, strength and thermal shock resistance, of the cordierite ceramic honeycomb structural bodies. As such, it should be noted the atmosphere utilized in each instance should be empirically determined based on the properties desired for the cordierite ceramic structural body.

We claim:

1. A method of fabricating a cordierite honeycomb structural body comprising the steps of:

formulating a batch of raw materials comprising a mixture of kaolin clay, talc, alumina and other cordierite-forming materials, each of the raw materials included in the batch in an effective amount, which in combination with the other raw materials therein, is capable of yielding a fired honeycomb body whose predominant crystal phase is cordierite;

intimately blending the raw materials with an effective amount of vehicle and forming aids to impart plastic formability and green strength to the raw materials and to form a plastic mixture;

forming the raw materials into a green honeycomb structural body by extrusion and thereafter drying the green honeycomb structural body;

firing the green honeycomb structural body by heating the green body to a first temperature range between about 750–850° C. and thereafter to a second temperature range between about 1250 to 1350° C. and thereafter to a third temperature of at least 1390° C., and thereafter maintaining the temperature at the third temperature for a soak period of about 12 to 20 hours, wherein an oxidizing firing atmosphere comprising $O_2$ in an amount up to about 5% is maintained for the first and second temperature ranges, an oxygen content of about 1% $O_2$ is maintained for the third temperature range and an oxygen content of about 2% $O_2$ is maintained for the soak period.

2. The method of fabricating cordierite structural honeycomb bodies according to claim 1 wherein the first temperature range is between about 790 to 810° C.

3. The method of fabricating cordierite structural honeycomb bodies according to claim 1 wherein the first temperature is approximately 800° C.

4. The method of fabricating cordierite structural honeycomb bodies according to claim 1 wherein the second temperature range is between about 1275 to 1285° C.

5. The method of fabricating cordierite structural honeycomb bodies according to claim 1 wherein a firing rate of between about 40–100° C. is utilized during the firing from the first to the second temperature range.

6. The method of fabricating cordierite structural honeycomb bodies according to claim 1 wherein a firing rate of between about 10–50° C. is utilized during the firing from the second to the third temperature range.

7. The method of fabricating cordierite structural honeycomb bodies according to claim 1 wherein the second temperature is approximately 1280° C.

8. The method of fabricating cordierite structural honeycomb bodies according to claim 1 wherein the third temperature is approximately 1403° C.

9. A method of fabricating a cordierite honeycomb structural body comprising the steps of:

formulating a batch of raw materials comprising a mixture of kaolin clay, talc, alumina and other cordierite-forming materials, each of the raw materials included in the batch in an effective amount, which in combination with the other raw materials therein, is capable of yielding a fired honeycomb body whose predominant crystal phase is cordierite;

intimately blending the raw materials with an effective amount of vehicle and forming aids to impart plastic formability and green strength to the raw materials and to form a plastic mixture;

forming the raw materials into a green honeycomb structural body by extrusion and thereafter drying the green honeycomb structural body, firing the green honeycomb structural body by heating the green body to a first temperature ranging between about 750–850° C. and thereafter to a second temperature ranging between about 1250 to 1350° C., and thereafter to a third temperature of at least 1390° C., and thereafter holding the temperature at the third temperature for a period of about 12 to 20 hours, wherein a reducing firing atmosphere comprising CO in an amount no greater than about 3% is maintained during selected periods at firing temperatures above the first temperature.

10. The method of fabricating cordierite structural honeycomb bodies according to claim 9 wherein the first temperature range is between about 790 to 810° C.

11. The method of fabricating cordierite structural honeycomb bodies according to claim 9 wherein the first temperature is approximately 800° C.

12. The method of fabricating cordierite structural honeycomb bodies according to claim 9 wherein the second temperature range is between about 1275 to 1285° C.

13. The method of fabricating cordierite structural honeycomb bodies according to claim 9 wherein a firing rate of between about 40–100° C. is utilized during the firing from the first to the second temperature range.

14. The method of fabricating cordierite structural honeycomb bodies according to claim 9 wherein a firing rate of between about 10–50° C. is utilized during the firing from the second to the third temperature range.

15. The method of fabricating cordierite structural honeycomb bodies according to claim 9 wherein the second temperature is approximately 1280° C.

16. The method of fabricating cordierite structural honeycomb bodies according to claim 9 wherein the third temperature is approximately 1403° C.

17. The method of fabricating cordierite structural honeycomb bodies according to claim 9 wherein the reducing firing atmosphere comprising 2% CO is maintained during the entire period of firing from the first temperature to the second temperature.

18. The method of fabricating cordierite structural honeycomb bodies according to claim 9 wherein an oxidizing atmosphere comprising no greater than about 6% $O_2$ is maintained at firing temperatures between 1100 and 1300° C.

19. The method of fabricating cordierite structural honeycomb bodies according to claim 18 wherein the oxidizing atmosphere comprises about 1% $O_2$.

* * * * *